(No Model.)
H. C. SCHRADER.
MOLD FOR HOLLOW GLASSWARE.
No. 344,500. Patented June 29, 1886.
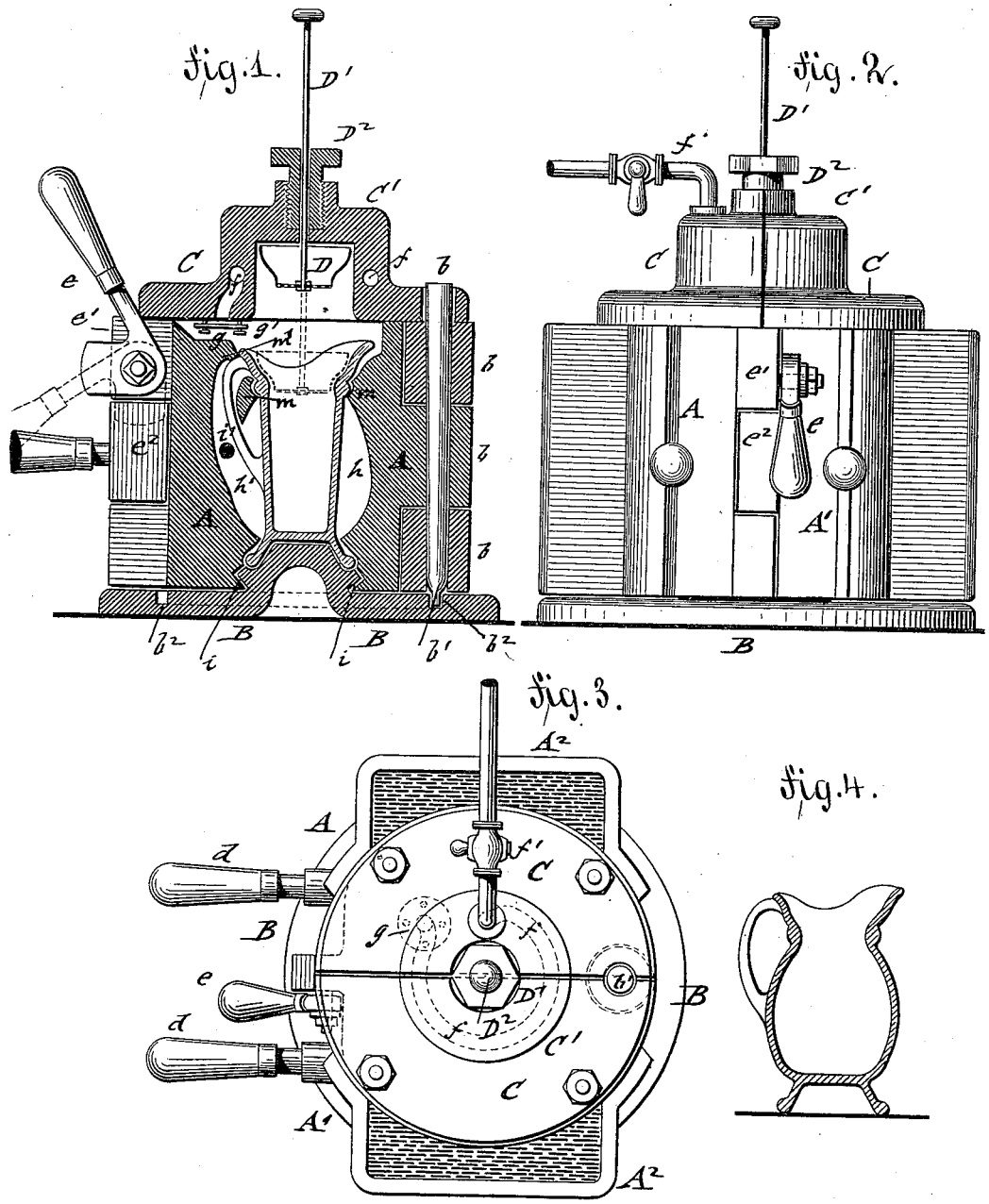

United States Patent Office.

HENRY C. SCHRADER, OF WHEELING, WEST VIRGINIA.

MOLD FOR HOLLOW GLASSWARE.

SPECIFICATION forming part of Letters Patent No. 344,500, dated June 29, 1886.

Application filed June 12, 1885. Serial No. 168,413. (No model.)

*To all whom it may concern:*

Be it known that I, HENRY C. SCHRADER, of Wheeling, in the county of Ohio and State of West Virginia, have invented certain new and useful Improvements in Molds for Hollow Glassware, of which the following is a specification.

This invention relates to a mold for hollow pressed glassware, whereby an outwardly-bulging form can be imparted to the body of the same.

In the accompanying drawings, Figure 1 represents a vertical longitudinal section of my improved mold for hollow pressed glassware. Fig. 2 is an end elevation; Fig. 3, a plan, and Fig. 4 a sectional view of a hollow glass article after the same has been bulged out in the mold.

Similar letters of reference indicate corresponding parts.

Referring to the drawings, A A' are the sections of my improved mold for hollow glassware, which are hinged together at one end by perforated ears $b$ $b$ and a pintle, $b'$. The lower end of the pintle $b'$ projects into a circular groove, $b^2$, in the bottom B of the mold, by means of which the mold-sections can be opened or closed symmetrically to the center line of the body, so as to clear the glass body placed in position on the bottom of the mold, without injuring the same by pressure in lifting off the mold-sections. The opposite ends of the mold-sections are provided with fixed horizontal handles $d$ $d$, and with a key, $e$, that is pivoted to the projecting cheek $e'$ of the mold-section A, and adapted to engage the rear part of the cheek $e^2$ of the other mold-section, A', as shown in Figs. 1 and 2, whereby the mold-sections are rigidly locked together. The top C of the mold is made of two sections, which are attached permanently to the sections A A'.

In the cover C is arranged a circuitous air channel or passage, $f$, which communicates by a valved pipe, $f'$, with a rubber hose or pipe, by which compressed air is conducted to the channel $f$ and the interior of the mold.

Below the discharge-opening of the air-channel $f$ of the cover C is arranged a distributing-diaphragm, $g$, that is supported by screws $g'$ at the underside of the cover, and which serves for preventing the direct impact of the air with the glass article in the mold.

The air-channel $f$ in the cover C is intended for heating up the air during its passage through the cover and prior to its entrance into the mold, so as to obviate any injurious cooling of the article in the mold.

The mold-sections A A' are provided at their inside with an enlarged or bulging portion, $h$, and with one or more recesses, $h'$, for the handles, said recesses $h'$ being larger than required, so as to provide for the changing position of the handle in consequence of the outward bulging of the hollow glass body. The hollow glass article is first pressed with a straight body in one mold and then transferred to the mold-sections A A'. The article has to fit tightly to a rim, $m$, of the mold, Fig. 1, the handle being also made to fit tightly at its upper part to a cheek, $m'$, so as to prevent the passage of the compressed and heated air into the spaces outside of the glass article. The air in the spaces outside of the article is passed to the outside by openings $i$ $i'$ in the bottom and in the handle portion of the mold when the body is bulged outwardly by the action of the compressed air on the inside of the article. When the glass article has been transferred into the mold A A', it is tightly closed around the same. A neck-forming piece, D, that corresponds to the interior shape of the neck of the hollow glass vessel, is provided in its bottom with a number of perforations, and serves to hold the neck of the glass vessel firmly in position on the rim, said neck-former being made in such a manner as to be lowered after the mold has been closed.

For permitting the raising of the neck-former D before opening the mold, the cover C is provided with a dome-shaped portion, C', that provides the required space for the neck-former. The stem D' of the neck-former D slides in a stuffing-box, D², of the cover C, or screws up or down in the same, as desired.

The mold-sections A A' are provided at their outer sides with pockets A² A², that are open at the top and filled with molten glass, so as to keep the mold hot and permit the bulging of the body of the hollow glass article by the pressure of air admitted on the interior of the same, without altering the shape of the neck portion, as will more fully appear by reference to a separate application for Letters Patent for a method for making hollow tableware with bulging bodies, which has been filed by me April 30, 1885, Serial No. 163,915.

Having thus described my invention, I claim as new and desire to secure by Letters Patent—

1. A mold for making hollow glassware, consisting of hinged sections, a cover, and an interior perforated neck-former guided in said cover, substantially as set forth.

2. The combination, with hinged mold-sections connected by ears and a pintle, of a top, and a bottom having an annular groove, into which the lower end of the pintle is extended, substantially as described.

3. A mold for hollow glassware, composed of two hinged sections, a dome-shaped cover having a stuffing-box, and an interior neck-former having a stem guided in said stuffing-box, substantially as set forth.

4. A mold for hollow glassware, composed of two hinged sections, a dome-shaped cover having a stuffing-box, and an interior perforated neck-former having a stem guided in said stuffing-box, said cover being provided with an independent channel for admitting compressed air, substantially as described.

5. A mold for hollow glassware, composed of two hinged sections, a dome-shaped cover having a stuffing-box, and an interior perforated neck-former having a stem guided in said stuffing-box, said cover being provided with an independent channel passing therethrough in a circuitous course, for admitting compressed air and heating it in its passage to the glass to be molded, substantially as described.

In testimony that I claim the foregoing as my invention I have signed my name in presence of two subscribing witnesses.

HENRY C. SCHRADER.

Witnesses:
GEORGE ARKLE,
ROBT. J. REED.